(12) United States Patent
Jang et al.

(10) Patent No.: US 8,976,983 B2
(45) Date of Patent: Mar. 10, 2015

(54) METHOD FOR GENERATING AND PLAYING OBJECT-BASED AUDIO CONTENTS AND COMPUTER READABLE RECORDING MEDIUM FOR RECODING DATA HAVING FILE FORMAT STRUCTURE FOR OBJECT-BASED AUDIO SERVICE

(75) Inventors: Inseon Jang, Daejeon (KR); Jeongil Seo, Daejeon (KR); Hui Yong Kim, Daejeon (KR); Tae Jin Lee, Daejeon (KR); Kyeongok Kang, Daejeon (KR); Jin Woo Hong, Daejeon (KR); Jin Woong Kim, Daejeon (KR); Chieteuk Ahn, Daejeon (KR); SeungChul Ham, Gyeonggi-do (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1105 days.

(21) Appl. No.: 12/989,240

(22) PCT Filed: Apr. 23, 2009

(86) PCT No.: PCT/KR2009/002129
§ 371 (c)(1),
(2), (4) Date: Oct. 22, 2010

(87) PCT Pub. No.: WO2009/131391
PCT Pub. Date: Oct. 29, 2009

(65) Prior Publication Data
US 2011/0064249 A1 Mar. 17, 2011

Related U.S. Application Data

(60) Provisional application No. 61/081,093, filed on Jul. 16, 2008.

(30) Foreign Application Priority Data

| Apr. 23, 2008 | (KR) | 10-2008-0037498 |
| Apr. 30, 2008 | (KR) | 10-2008-0040912 |
| Jun. 25, 2008 | (KR) | 10-2008-0060493 |
| Nov. 18, 2008 | (KR) | 10-2008-0114413 |
| Apr. 22, 2009 | (KR) | 10-2009-0034992 |

(51) Int. Cl.
| H04B 1/00 | (2006.01) |
| G10L 19/00 | (2013.01) |
| G11B 27/034 | (2006.01) |
| G11B 27/32 | (2006.01) |
| G10L 19/008 | (2013.01) |
| H04H 60/04 | (2008.01) |

(52) U.S. Cl.
CPC .......... *G10L 19/0019* (2013.01); *G11B 27/034* (2013.01); *G11B 27/32* (2013.01); *G10L 19/008* (2013.01); *H04H 60/04* (2013.01)
USPC ............................................ 381/119; 700/94

(58) Field of Classification Search
USPC ............. 381/17, 18, 19–23, 309, 310, 1, 306, 381/307, 119; 700/94
See application file for complete search history.

(56) References Cited

U.S. PATENT DOCUMENTS

| 8,359,113 B2* | 1/2013 | Oh et al. .......................... 700/94 |
| 8,370,164 B2* | 2/2013 | Beack et al. .................... 704/503 |
| 2005/0086582 A1* | 4/2005 | Frojdh et al. ................ 715/501.1 |
| 2006/0112338 A1* | 5/2006 | Joung et al. .................... 715/733 |
| 2006/0174267 A1* | 8/2006 | Schmidt .......................... 725/39 |
| 2008/0123258 A1* | 5/2008 | Singh ............................ 361/679 |
| 2008/0255689 A1* | 10/2008 | Nagayama ........................ 700/94 |
| 2009/0157750 A1* | 6/2009 | Kim et al. ..................... 707/104.1 |
| 2010/0076577 A1* | 3/2010 | Lee et al. ........................ 700/94 |

FOREIGN PATENT DOCUMENTS

| CN | 1591653 | 3/2005 |
| CN | 1599455 | 3/2005 |
| CN | 101099196 | 1/2008 |
| EP | 1519587 A2 | 3/2005 |
| JP | 2004-72716 | 3/2004 |
| JP | 2005-136503 | 5/2005 |
| KR | 1020040037437 | 5/2004 |
| KR | 1020070047192 | 5/2007 |
| KR | 1020070061100 | 6/2007 |
| KR | 1020080029940 | 4/2008 |
| KR | 1020080095928 | 10/2008 |
| KR | 1020090037278 | 4/2009 |
| KR | 1020090047355 | 5/2009 |
| WO | 2007/027066 A1 | 3/2007 |
| WO | 2007/136187 A1 | 11/2007 |
| WO | 2008/069593 A1 | 6/2008 |

OTHER PUBLICATIONS

Jang, Inseon et al., "A proposal for technical specification of Interactive Music AF," International Organisation for Standardisation, Organisation Internationale de Normalisation, ISO/IEC JTC1/SC29/WG11, Coding of Moving Pictures and Audio, 10 pages, (2008).

Lee, Taejin et al., "An Object-based 3D Audio Broadcasting System for Interactive Service," Audio Engineering Society Convention Paper 6384, 8 pages (2005).

International Search Report for Application No. PCT/KR2009/002129, dated Sep. 30, 2009.

* cited by examiner

*Primary Examiner* — Vivian Chin
*Assistant Examiner* — Friedrich W Fahnert
(74) *Attorney, Agent, or Firm* — Nelson Mullins Riley & Scarborough LLP; Anthony A. Laurentano, Esq.; Lewis Lee, Esq.

(57) ABSTRACT

Provided are a method of generating and playing an object-based audio content that may effectively store preset information about an object-based audio content, and a computer-readable recording medium for storing data having a file format structure for an object-based audio service. The method of generating the object-based audio content may include: receiving a plurality of audio objects (310) generating at least one preset using the plurality of audio objects (320) and storing a preset parameter with respect to an attribute of the at least preset and the plurality of audio objects (330). The preset parameter may be stored in a form of a box that is defined in a media file format about the object-based audio content. Through this, it is possible to effectively store a preset about a plurality of audio objects.

46 Claims, 8 Drawing Sheets

VOCAL

PIANO

DRUM

METHOD FOR GENERATING AND PLAYING OBJECT-BASED AUDIO CONTENTS AND COMPUTER READABLE RECORDING MEDIUM FOR RECODING DATA HAVING FILE FORMAT STRUCTURE FOR OBJECT-BASED AUDIO SERVICE

RELATED APPLICATIONS

This application is a 35 U.S.C. §371 national stage filing of PCT Application No. PCT/KR2009/002129 filed on Apr. 23, 2009, which claims priority to, and the benefit of, Korean Patent Application No. 10-2008-0037498 filed on Apr. 23, 2008; Korean Patent Application No. 10-2008-0040912 filed on Apr. 30, 2008; Korean Patent Application No. 10-2008-0060493 filed on Jun. 25, 2008; U.S. Provisional Application No. 61/081,093 filed on Jul. 16, 2008; Korean Patent Application No. 10-2008-0114413 filed on Nov. 18, 2008 and Korean Patent Application No. 10-2009-0034992 filed on Apr. 22, 2009. The contents of the aforementioned applications are hereby incorporated by reference.

TECHNICAL FIELD

The present invention relates to a method of generating and playing an object-based audio content that may effectively store preset information about an object-based audio content, and a computer-readable recording medium for storing data having a file format structure for an object-based audio service.

BACKGROUND ART

An existing audio signal provided through broadcasting services such as a television (TV) broadcasting service, a radio broadcasting service, a Digital Multimedia Broadcasting (DMB) service, and the like, may be stored and be transmitted in a single audio signal in a manner that audio signals obtained from various types of sound sources are mixed.

In this environment, a user may adjust a strength of the entire audio signal but may not control a characteristic of the audio signal for each sound source, for example, adjusting of the strength of the audio signal for each sound source that is included in the corresponding audio signal.

However, when an audio content is created, the audio signal for each sound source may not be synthesized but may be independently stored. In this case, a content play terminal enables the user to listen to the audio content while controlling the strength of the audio signal for each sound source.

An audio service that may independently store and transmit a plurality of audio signals in a storage/transmission end, and enables the user to listen to a corresponding audio content while appropriately controlling each of the audio signal in a receiver, for example, a content play device is referred to as an object-based audio service.

The above object-based audio service defines attributes such as a location of each object, a strength of a sound, an acoustic characteristic according to locations of objects, and the like, using a preset, and provides the defined attributes. Accordingly, the user may use the attributes to play an audio content. Specifically, when a plurality of preset audio information is generated and is included in a file, a reception side may more effectively use the object-based audio service.

An existing International Standardization Organization base media file format (ISO-BMFF) defines a structure that includes all of various types of media such as audio, video, still images, and the like. The file structure may be flexible and extendable with respect to an interchange, a management, an edition, and a presentation of media.

When a storage or a transmission is performed by adding an audio track and preset information to the ISO-BMFF, it is possible to further effectively provide the object-based audio service.

DISCLOSURE OF INVENTION

Technical Problem

An aspect of the present invention provides a method of generating an object-based audio content that may effectively store a preset about a plurality of audio objects.

Technical Solution

According to an aspect of the present invention, there is provided a method of generating an object-based audio content, the method including: receiving a plurality of audio objects; generating at least one preset using the plurality of audio objects; and storing a preset parameter with respect to an attribute of the at least one preset and the plurality of audio objects. The preset parameter may be stored in a form of a box that is defined in a media file format about the object-based audio content.

Here, the media file format may be in a structure of an International Standardization Organization base media file format (ISO-BMFF).

Also, the box may include a moov box, the moov box includes a first box defined in the moov box, and the first box includes a second box defined in the first box. The preset parameter may include a first preset parameter and a second preset parameter, and the first preset parameter includes at least one of a number of the at least one preset and a preset identification (ID) of any one preset of the at least one preset. The first preset parameter may be stored in the first box, and the second preset parameter may be stored in the second box.

According to another aspect of the present invention, there is provided a method of playing an object-based audio content, the method including: recovering a plurality of audio objects and at least one preset from the object-based audio content; mixing the plurality of audio objects, based on the at least one preset, to generate an output audio signal; and playing the output audio signal. Each of the at least one preset may include a preset parameter. The preset parameter may be stored in the object-based audio content in a form of a box that is defined in a media file format about the object-based audio content.

According to still another aspect of the present invention, there is provided a computer-readable recording medium storing data with a file format structure for an object-based audio service, including: an ftyp box to store standard information of an object-based audio content; an mdat box to store a plurality of audio objects that constitute the object-based audio content; and a moov box to store metadata that presents the stored plurality of audio objects. A preset parameter about at least one preset generated using the plurality of audio objects may be stored in any one of the ftyp box and the moov box.

MODE FOR THE INVENTION

Figure 1:
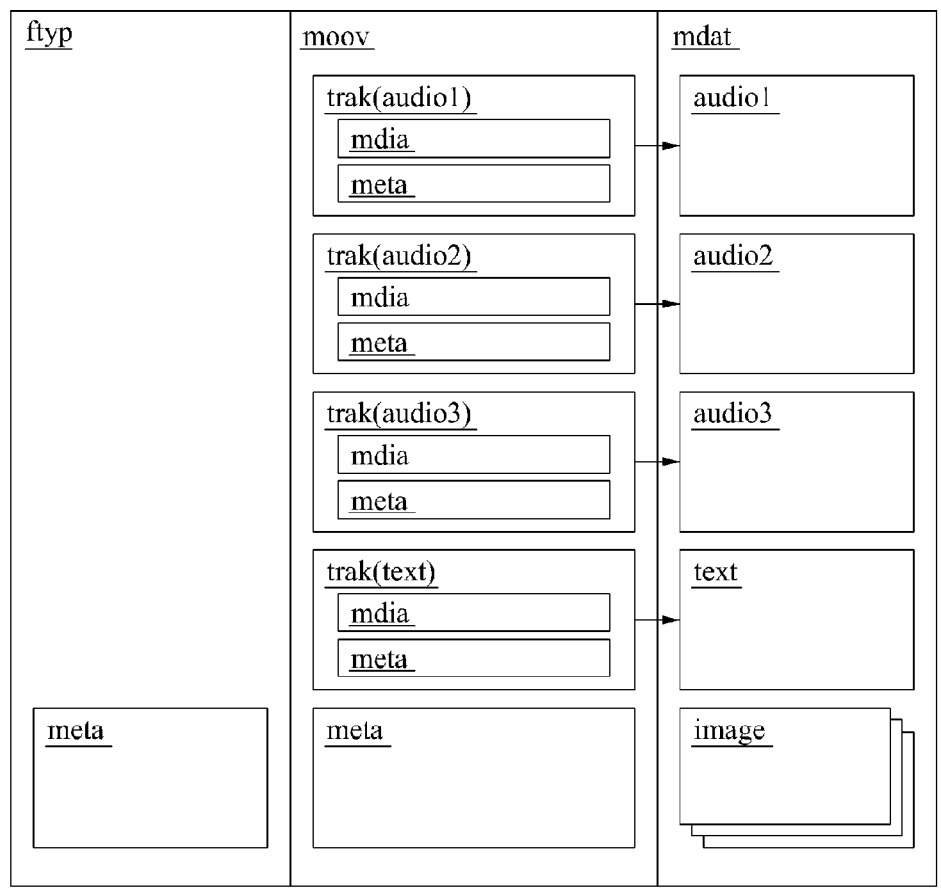
FIG. 1 illustrates a basic structure of a media file format for storing an object-based audio content according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 illustrates a basic structure of a media file format for storing an object-based audio content according to an embodiment of the present invention.

Referring to FIG. 1, the structure of the media file format for storing the object-based audio content may include an ftyp box (hereinafter, 'ftyp') to store standard information of the object-based audio content, that is, type information of an object-based audio content file, a moov box (hereinafter, 'moov') to store metadata, for example, a decoding time, for a presentation of a plurality of audio object data that constitute the object-based audio content, and an mdat box (hereinafter, 'mdat') to store the plurality of audio object data.

'ftyp' and 'moov' may include a meta box (hereinafter, 'meta'). Generally, descriptive metadata about the plurality of audio object data stored in 'mdat' may be stored in 'meta'.

Here, the media file format for storing the object-based audio content may be in the structure of an International Standardization Organization base media file format (ISO-BMFF).

Hereinafter, a method of storing a plurality of audio objects and a preset associated with playing of an object-based audio content according to the ISO-BMFF to thereby generate the object-based audio content will be described. However, as described above, the method of generating the object-based audio content is not limited to the object-based audio content having the structure of the ISO-BMFF and thus may be extendable with respect to a multi-channel audio content that is in a structure of a media file format to store multimedia data such as an MP4 file and the like.

Prior to describing the method of generating the object-based audio content according to an embodiment of the present invention, a preset parameter to indicate an attribute of a preset storing the object-based audio content will be described. The preset parameter may include at least one of the following preset information.

1. Preset name, preset identification (ID):

The 'preset name' denotes a string corresponding to a preset, and the 'preset ID" denotes an integer corresponding to the preset.

2. Number of presets, default preset ID:

The 'number of presets' denotes a number of presets included in the object-based audio content.

The 'default preset ID' denotes a preset ID that needs to be most initially played in an initial state where a user interaction does not exist, when the object-based audio content is played. The 'default preset ID' may correspond to any one of preset IDs included in the object-based audio content.

3. Whether to display preset information:

The 'whether to display preset information' denotes information regarding whether to display preset information for a user when the object-based audio content is played. The preset information may include, for example, volume information or frequency gain information for each input track or each input channel.

4. Editing probability of a preset:

The 'editing probability of a preset' denotes information regarding whether a user may edit a preset when the object-based audio content is played.

5. Number of input tracks, input track ID, number of input channels for each input track:

The 'number of input tracks' denotes a number of input tracks that are stored in the object-based audio content. Here, each of the input tracks may correspond to a sound source. Specifically, when the object-based audio content includes a vocal, a piano, and a drum, each of the vocal, the piano, and the drum may constitute a single track.

The 'input track ID' denotes an integer corresponding to each of the input tracks.

The 'number of input channels for each input track' denotes a number of channels included in each of the input tracks.

Hereinafter, a relationship between a track and a channel will be described with reference to FIG. 2.

Figure 2:
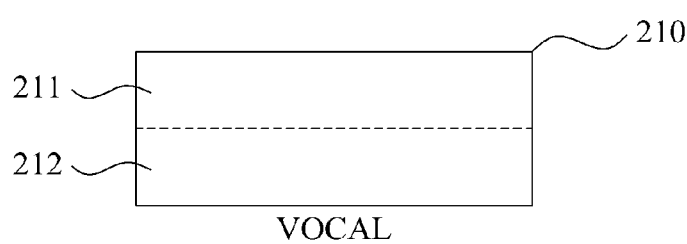
FIG. 2 illustrates a relationship between a track and a channel according to an embodiment of the present invention.
Figure 2:
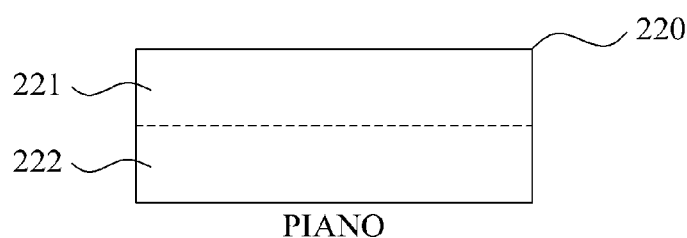
Figure 2:
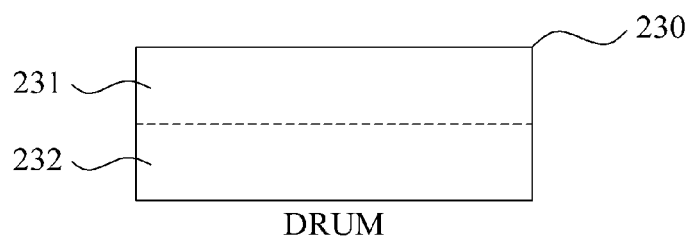

FIG. 2 illustrates a relationship between a track and a channel according to an embodiment of the present invention.

FIG. 2 illustrates a vocal track 210, a piano track 220, and a drum track 230.

When recording sound sources and in this instance, recording each of the sound sources using 2-channel, that is, a stereo channel, each track may include two channels. Specifically, when recording a vocal, a piano, and a drum using 2-channel, the vocal track 210 may include a first channel 211 and a second channel 212, the piano track 220 may include a first channel 221 and a second channel 222, and the drum track 230 may include a first channel 231 and a second channel 232. Although all the tracks include the same number of channels in FIG. 2, a number of channels included in each track may be different.

In this instance, when a creator of the object-based audio content sets a preset for each track, a plurality of audio objects may correspond to the tracks, respectively. When the creator sets the preset for each channel, the plurality of audio objects may correspond to the channels, respectively.

6. Output channel type, number of output channel:

The 'output channel type' denotes information regarding via which channel the object-based audio object is played. The 'number of output channels' denotes a number of output channels according to the output channel type.

7. Number of frequency bands, center frequency of each of the frequency bands, bandwidth of each of the frequency bands for sound equalization:

The 'number of frequency bands' denotes a number of frequency bands to be applied with a sound equalization for compensating for transformation of a signal that may occur, while amplifying or transmitting the signal.

8. Volume information for each input track or each input channel:

The 'volume information' denotes information about a volume of each of audio objects. When an audio object corresponds to an input track, the 'volume information for each input track' may be stored in the object-based audio content. When the audio object corresponds to an input channel, the 'volume information for each input channel' may be stored in the object-based audio content.

9. Frequency gain information for each input track or each input channel:

The 'frequency gain information' denotes information about a frequency gain when applying the sound equalization. When an audio object corresponds to an input track, the 'frequency gain information for each input track' may be stored in the object-based audio content. When the audio object corresponds to an input channel, the 'frequency gain information for each input channel' may be stored in the object-based audio content.

10. Preset global volume information:

The 'preset global volume information' denotes information for adjusting the global volume of a plurality of audio objects.

11. Magnitude of a sound image and angle of the sound image:

The 'magnitude of the sound image' and the 'angle of the sound image' denote a magnitude value of the sound image and an angle value of the sound image, respectively. The sound image is formed by a plurality of channels stored in the object-based audio content.

The creator of the object-based audio content may generate the object-based audio content using various types of schemes by store the preset parameter including at least one of the above listed information, according to the ISO-BMFF.

Figure 3:
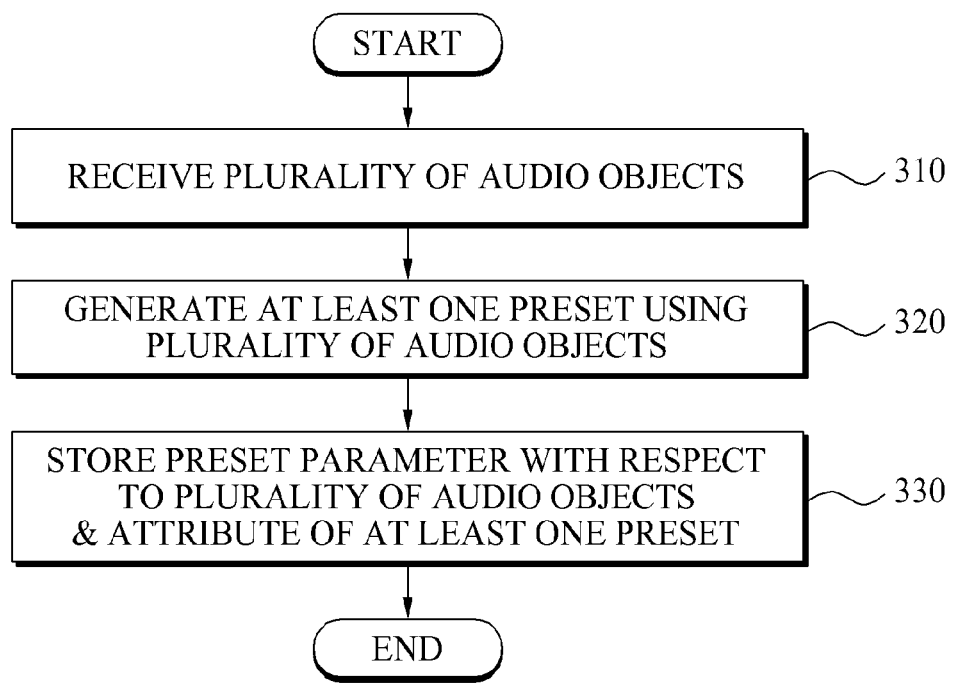
FIG. 3 is a flowchart illustrating a method of generating an object-based audio content according to an embodiment of the present invention.

FIG. 3 is a flowchart illustrating a method of generating an object-based audio content according to an embodiment of the present invention.

In operation 310, the object-based audio content generating method may receive a plurality of audio objects.

In operation 320, the object-based audio content generating method may generate at least one preset using the plurality of audio objects.

In operation 330, the object-based audio content generating method may store a preset parameter with respect to the plurality of audio objects and an attribute of the at least one preset. As described above, the preset parameter may include at least one of the above listed information.

In this case, the preset parameter may be stored in a form of a box that is defined in a media file format about the object-based audio content.

Hereinafter, operation 330 of storing the preset parameter will be described in detail.

Store a Preset Parameter in 'meta' Included in 'ftyp' or 'meta' Included in 'moov':

According to an embodiment of the present invention, a preset parameter may be stored in 'meta' included in 'ftyp' (hereinafter, a first 'meta'), or in 'meta' included in 'moov' (hereinafter, a second 'meta').

Specifically, as described above, description information or descriptive metadata indicating general information about an object-based audio content, for example, a song title, a singer, an album name, and the like, may be stored in the first 'meta' or the second 'meta'. A preset parameter may be stored together with the description information.

Store a Preset Parameter in 'meta' Different from 'meta' Storing Description Information:

According to an embodiment of the present invention, a preset parameter may be stored in 'meta' different from 'meta' storing description information about an object-based audio content.

The description information may be information associated with identifying of the object-based audio content and the preset parameter may be information associated with playing of the object-based audio content. Specifically, since an attribute of the description information is different from an attribute of the preset parameter, it may be desirable to separately handle the description information and the preset parameter.

For example, the description information may be stored in a first 'meta' and the preset parameter may be stored in a second 'meta'.

Since an ISO-BMFF defines that only a single 'meta' may exist in a single level, each of 'ftyp' and 'moov' may include only the single 'meta' in a lower level. Accordingly, to separately store the description information and the preset parameter, the description information and the preset parameter may need to be stored in 'meta' existing in different levels, that is, in the first 'meta' and the second 'meta'. In this case, since the preset parameter has an attribute of metadata for presentation, the description information may be stored in the first 'meta' and the preset parameter may be stored in the second 'meta'.

As another example, the description information may be stored in 'meta', that is, the first 'meta' and the second 'meta', as is. The preset parameter may be stored in a meco box (hereinafter, 'meco') included in 'ftyp' or 'moov'.

Since 'meco' is an additional metadata contain box that is defined by the ISO-BMFF, different metadata that is not defined by the ISO-BMFF may be stored in 'meco'. Accordingly, the preset parameter may be stored in any one of 'meco' included in 'ftyp' or 'meco' included in 'moov'.

Store a Preset Parameter in a Box Newly Defined in 'moov'

According to an embodiment of the present invention, a preset parameter may be stored in a box that is newly defined in 'moov'.

As described above, since an attribute of the preset parameter is different from an attribute of description information, it may be desirable to separately handle the preset parameter and the description information. Also, since the preset parameter includes an attribute of metadata for presentation, it may be desirable to store the preset parameter in 'moov'. Accordingly, in order to effectively handle the preset parameter, it may be desirable to define a new box in 'moov' and to store the preset parameter in the newly defined box.

Figure 4:
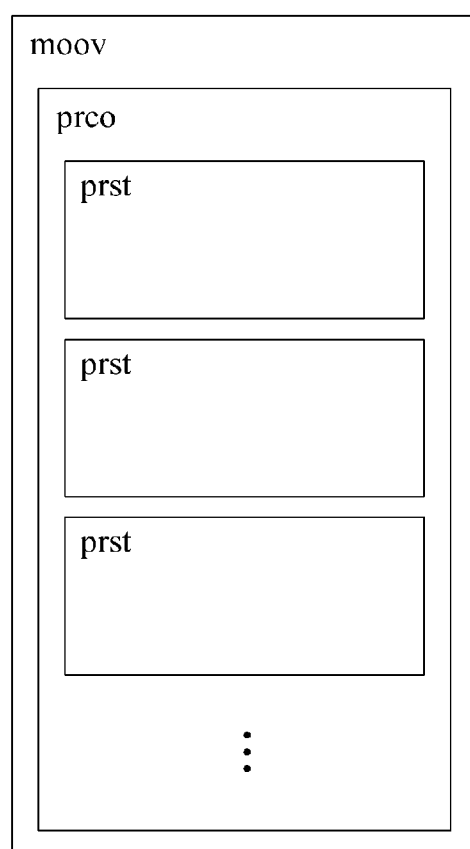
FIG. 4 illustrates a structure of 'moov' according to an embodiment of the present invention.

FIG. 4 illustrates a structure of 'moov' according to an embodiment of the present invention.

As shown in FIG. 4, two boxes may be defined within 'moov'.

A first box is a box defined in 'moov'. The first box may store a first preset parameter that is a preset parameter indicating the entire information of the preset. Hereinafter, the first box is referred to as a preset container box, that is, 'prco'.

For example, the first preset parameter may include at least one of the number of presets and the default preset ID, which are described above. The default preset ID denotes a preset ID to be most initially played in an initial state where a user interaction does not exist, when an object-based audio content is played. The default preset ID may correspond to any one preset ID among preset IDs that are included in the object-based audio content.

A second box is a box defined in 'prco'. The second box may store a second preset parameter that is a preset parameter about an attribute of the preset.

For example, the second preset parameter may include the remaining information excluding the number of presets and the default preset ID from the above listed information. Hereinafter, the second box is referred to as a preset box, that is, 'prst'.

'prco' may include 'prst' corresponding to the number of presets that are included in the object-based audio content. When the preset is not stored in the object-based audio content, 'prst' may not exist in 'prco'.

For example, 'prst' may include the preset parameter that contains the remaining preset information excluding the number of presets and the default preset ID from the above listed preset information.

According to an embodiment of the present invention, when 'moov' includes 'prco' and 'prst', the structure of the ISO-BMFF may be expressed by the following Table 1:

TABLE 1

| ftyp | | | | | file type and compatibility |
|---|---|---|---|---|---|
| moov | | | | | container for all the metadata |
| | mvhd | | | | movie header, overall declarations |
| | trak | | | | container for an individual track or stream |
| | | tkhd | | | track header, overall information about the track |
| | | tref | | | track reference container |
| | | edts | | | edit list container |
| | | | elst | | an edit list |
| | | mdia | | | container for the media information in a track |
| | | | mdhd | | media header, overall information about the media |
| | | | hdlr | | handler, declares the media (handler) type |
| | | | minf | | media information container |
| | | | | smhd | sound media header, overall information (sound track only) |
| | | | | hmhd | hint media header, overall information (hint track only) |
| | | | | nmhd | Null media header, overall information (some tracks only) |
| | | | | dinf | data information box, container |
| | | | | dref | data reference box. declares source(s) of media data in track |
| | | | | stbl | sample table box, container for the time/space map |
| | | | | stsd | sample descriptions (codec types, initialization etc.) |
| | | | | stts | (decoding) time-to-sample |
| | | | | stsc | sample-to-chunk, partial data-offset information |
| | | | | stsz | sample sizes (framing) |
| | | | | stz2 | compact sample sizes (framing) |
| | | | | stco | chunk offset, partial data-offset information |
| | | | | co64 | 64-bit chunk offset |
| | prco | | | | container for the presets |
| | | prst | | | preset box, container for the preset information |
| mdat | | | | | media data container |
| free | | | | | free space |
| skip | | | | | free space |
| meta | | | | | Metadata |
| | hdlr | | | | handler, declares the metadata (handler) type |
| | dinf | | | | data information box, container |
| | | Dref | | | data reference box, declares source(s) of metadata items |
| | iloc | | | | item location |
| | iinf | | | | item information |
| | xml | | | | XML container |
| | bxml | | | | binary XML container |
| | pitm | | | | primary item reference |

Hereinafter, embodiments of syntax and semantics of 'prco' and 'prst' will be described in detail.

An embodiment of syntax of 'prco' may be expressed by the following Table 2:

TABLE 2

Preset Container Box
Box type: 'prco'
Container: Movie Box ('moov')
Mandatory: Yes
Quantity: Exactly one TABLE 2-continued

```
syntax
aligned(8) class PresetContainerBox extends Box('prco'){
    unsigned int(8) num_preset;
    unsigned int(8) default_preset_ID;
}
```

Semantics according to the syntax of the above Table 2 may follow as:

'num_preset' denotes a number of presets included in 'prco'.

'default_preset_ID' denotes the default preset ID. When a creator does not set 'default_preset_ID', a preset ID of a preset with a smallest preset ID value may be set as 'default_preset_ID'.

When 'default_preset_ID' is set to '0', the object-based audio content may be played according to a preset stored in a bitstream of audio objects, which are encoded and are stored using an MPEG-D spatial audio object coding (SAOC) technology, among a plurality of audio objects included in the object-based audio content. It will be further described in detail later with reference to FIG. 6.

General syntax of 'prst' may be expressed by the following Table 3:

TABLE 3

Preset Box
Box type: 'prst'
Container: Preset Container Box ('prco')
Mandatory: No TABLE 3-continued Quantity: zero or more
syntax
aligned(8) class PresetBox extends FullBox('prst', version=0, flags){
    unsigned int(8)     preset_ID;
    unsigned int(8)     num_preset_track;
    unsigned int(8)     preset_track_ID[num_preset_track];
    unsigned int(8)     preset_type;
    unsigned int(8)     preset_global_volume;
    if(preset_type == 0) { }
    if(preset_type == 1) { }
    if(preset_type == 2) { }
    if(preset_type == 3) { }
    if(preset_type == 4) { }
    if(preset_type == 5) { }
    if(preset_type == 6) { }
    if(preset_type == 7) { }
    if(preset_type == 8) { }
    if(preset_type == 9) { }
    if(preset_type == 10) { }
    if(preset_type == 11) { }
    string       preset_name;
}

Semantics according to the syntax of the above Table 3 may follow as:

'version' denotes a version of 'prst'.

'flags' denotes flag information regarding whether to display information stored in 'prst' for a user and whether to allow the user to edit the information stored in 'prst', when the object-based audio content is played.

'flags' may be flag information having a data type of an 8-bit integer and have the meaning as given by the following Table 4:

TABLE 4

| Flags | Display | Edit |
|---|---|---|
| 0x01 | disable | disable |
| 0x02 | enable | disable |
| 0x03 | enable | enable |

Specifically, in the case 'flags' is 0x01, when the object-based audio content is played, preset information stored in 'prst' may not be displayed for the user and the user may not edit the preset information stored in 'prst'.

In the case 'flags' is 0x02, when the object-based audio content is played, the preset information stored in 'prst' may be displayed for the user whereas the user may not edit the preset information stored in 'prst'.

In the case 'flags' is 0x03, when the object-based audio content is played the preset information stored in 'prst' may be displayed for the user and the user may not edit the preset information stored in 'prst'.

'preset_ID' denotes the preset ID and may have a value greater than or equal to '1'.

'num_preset_track' denotes a number of input tracks associated with the preset.

'preset_track_ID[num_preset_track]' denotes an array to store an input track ID.

'preset_name' denotes a preset name.

'preset_global_volume' denotes preset global volume information.

Generally, in order to emphasize a rhythmic sense of the object-based audio content, the creator may increase a volume of a percussion-instrumental sound such as a drum to be relatively greater than other instrumental sounds and thereby generate the preset.

In this instance, when a relative volume difference between the percussion-instrumental sound and the other instrumental sounds is small, a user may not have a sufficient rhythmic sense. Conversely, when the relative volume difference between the percussion-instrumental sound and the other instrumental sounds is great, the global volume may decrease. The percussion-instrument sound generally has an attribute such as an effect sound. Accordingly, in comparison to the other instrumental sounds, a high frequency component of the percussion-instrumental sound occupies a greater portion over the entire play section.

For example, when a volume value of the preset including [vocal, piano, drum] is [250, 200, 400], the global volume may be appropriate but the rhythmic sense may not be emphasized. Also, when the volume value of the preset is [100, 150, 400], the rhythmic sense may be emphasized but the global volume may decrease.

The above phenomenon may be solved by further storing preset global volume information in the object-based audio content. The preset global volume information may be used to adjust the global volume of audio objects that constitute the preset.

Specifically, when a volume value of the entire input tracks is stored based on a basic global volume value set in the object-based audio content, and the preset is generated so that a preset global volume value may be greater than an existing global volume value, and in this instance, the object-based audio content is played, the relatively volume difference may further increase at a ratio of 'basic global volume value/preset global volume value'.

For example, when the basic global volume value is '50' and the volume value of the preset including [vocal, piano, drum] is [100, 150, 400] and the preset global volume value is set to 100, the volume of each instrument may increase by twice. Accordingly, the volume of the vocal and the piano constituting the main melody may increase by about twice and the global volume of the object-based audio content may become an appropriate level. Also, since the volume of the drum increases by twice, it is possible to emphasize the rhythmic sense.

As described above, when the volume is amplified using the preset global volume value, a sound quality may be deteriorated due to clipping and the like. However, when the percussion-instrumental sound is increased to be greater than or equal to a predetermined level, a user may not recognize the deterioration of the sound quality occurring in the percussion instrument. Based on this, the deterioration of the sound quality according to a use of the preset global volume information may not become an issue.

Also, when the basic global volume value is maximum, the preset global volume information may be used to increase the global volume.

Specifically, in general playing of the object-based audio content, when the basic global volume value is maximum, it may be impossible to adjust the volume of each of the audio objects. However, when the preset global volume information is stored in the object-based audio content, it is possible to play the object-based audio content at a volume greater than the maximum value of the basic global volume value.

'preset-type' denotes a preset type.

According to an embodiment of the present invention, the preset type may be determined based on a type of mixing information, an application target of the mixing information, whether the mixing information is updated over a play time of the object-based audio content. Hereinafter, a method of determining the preset type will be described in detail.

Initially, the preset type may be determined based on the type of the mixing information.

For example, the mixing information may include at least one of volume information and equalization information. Hereinafter, a preset generated based on only the volume information is referred to as a volume preset. A preset generated based on only the equalization information is referred to as an equalization preset. A preset generated based on both the volume information and the equalization information is referred to as a volume/equalization preset.

Also, the preset type may be determined based on the application target of the mixing information.

Specifically, the preset type may be determined depending on whether to apply the mixing information by considering an input track as an audio object, or whether to apply the mixing information by considering an input channel as the audio object. Hereinafter, a preset generated by considering the input track as the audio object is referred to as a track preset. A preset generated by considering the input channel as the audio object is referred to as a channel preset.

Also, the preset type may be determined based on whether the mixing information is updated over the play time of the object-based audio content.

Specifically, the preset type may be determined depending on whether the mixing information has a constant value or is updated as the object-based audio content is played. Hereinafter, when the mixing information is not updated, a preset is referred to as a static preset. When the mixing information is updated, the preset is referred to as a dynamic preset.

According to an embodiment of the present invention, when the dynamic preset is stored in the object-based audio content, a table mapping an input track ID and mixing information of the input track ID may be included in 'prst'. In this case, mixing information according to a sampling number of the input track may be induced based on the mixing information that is defined in the ISO-BMFF and is stored in a 'decoding time to sample box (stts)' and the above table. Here, relationship information between the decoding time and the sampling number is stored in 'stts'. Accordingly, when the object-based audio content is played, a random access may be enabled and an amount of mixing information to be stored in the object-based audio content may decrease.

When the preset is generated using the aforementioned information, the preset type may be classified as given by the following Table 5. Referring to the following Table 5, 12 presets may exist, which may be further extended according to a classification element.

TABLE 5

| preset_type | static(S)/ dynamic(D) | track(T)/ channel(C) | volume (Vol) | equalization (Eq) | meaning |
|---|---|---|---|---|---|
| 0 | S | T | Vol | — | static track volume preset |
| 1 | S | T | Vol | Eq | static track volume preset with equalization |
| 2 | S | T | — | Eq | static track equalization preset |
| 3 | D | T | Vol | — | dynamic track volume preset |
| 4 | D | T | Vol | Eq | dynamic track volume preset with equalization |
| 5 | D | T | — | Eq | dynamic track equalization preset |
| 6 | S | C | Vol | — | static object volume preset |
| 7 | S | C | Vol | Eq | static object volume preset with equalization |
| 8 | S | C | — | Eq | static object equalization preset |
| 9 | D | C | Vol | — | dynamic object volume preset |
| 10 | D | C | Vol | Eq | dynamic object volume preset with equalization |
| 11 | D | C | — | Eq | dynamic object equalization preset |

Referring to the above Table 5, the mixing information may include volume information and equalization information. The volume information and the equalization information may be stored in 'prst' in a different form. Here, a storage type of the mixing information may be classified depending on whether the preset type is a static preset or a dynamic preset.

1. When a preset type is a static preset:

When the preset type is the static preset, mixing information may be the same in a plurality of frames constituting the object-based audio content. Accordingly, the same mixing information may be stored for each audio object. Here, A storage type of the mixing information may be classified whether the preset type is a track preset or a channel preset.

1.1. When a preset type is a static/track preset, that is, when a value of 'preset_type' is 0, 1, 2:

When mixing information is stored for each track, an output channel type may be determined based on an input track having a largest number of channels among input tracks. For example, when a first input track includes two channels and a second input track includes a single channel, the number of channels included in the first input channel is greater than the number of channels included in the second input track. Accordingly, the output channel type may be determined as stereo.

In this case, syntax of a preset included in 'prst' may be given by the following Table 6 through Table 8:

TABLE 6

```
if(preset_type = 0){ // static track volume preset
    for(i=0; i<num_preset_track; i++){
        unsigned int(8)     preset_volume;
    }
}
```

TABLE 7

```
if(preset_type == 1){ // static track volume preset with equalization
    for(i=0; i<num_preset_track; i++){
        unsigned int(8)   preset_volume;
        unsigned int(8)   num_freq_band;
        for(j=0; j<num_freq_band; j++){
            unsigned int(16)        center_freq;
            unsigned int(16)        bandwidth;
            unsigned int(8)         preset_freq_gain;
        }
    }
}
```

TABLE 8

```
if(preset_type == 2){ // static track equalization preset
    for(i=0; i<num_preset_track; i++){
        unsigned int(8)   num_freq_band;
        for(j=0; j<num_freq_band; j++){
            unsigned int(16)        center_freq;
            unsigned int(16)        bandwidth;
            unsigned int(8)         preset_freq_gain;
        }
    }
}
```

Semantics according to the syntax of the above Table 6 through Table 8 may follow as:

'preset_volume' denotes volume information.

The volume information may include a volume gain value between an input volume value of an input track and an output volume value of an output track. The volume gain value may be expressed by a percentage or decibel (dB).

Also, the volume gain value expressed by the percentage or dB may be quantized and thereby be stored. In this case, the quantized volume gain value may be expressed by the following Table 9 and Table 10:

TABLE 9

| index | 0 | 1 | 2 | 3 | ... | 149 | 200 |
|---|---|---|---|---|---|---|---|
| value(ratio) | 0 | 0.02 | 0.04 | 0.06 | ... | 3.98 | 4.00 |

TABLE 10

| index | 0 | 1 | 2 | 3 | 4 | 5 | 6 | 7 | 8 | 9 | 10 | 11 | 12 | 13 |
|---|---|---|---|---|---|---|---|---|---|---|---|---|---|---|
| value(dB) | −25 | −21 | −18 | −15 | −12 | −8 | −5 | −3 | −1 | 0 | 1 | 2 | 3 | 4 |

'num_freq_band' denotes a number of frequency bands to be applied with a sound equalization and may have an integer value between zero and 32.

'center_freq' denotes a center frequency of each of the frequency bands and may have an integer value between zero Hz and 20,000 Hz.

'bandwidth' denotes a bandwidth of each of the frequency bands and may an integer value between zero Hz and 20,000 Hz.

'preset_freq_gain' denotes a frequency gain value in each of the frequency bands.

Like the volume gain value, the frequency gain value may also be expressed by a percentage or dB. Also, the frequency gain value expressed by the percentage or dB may be quantized and thereby be stored. In this case, the quantized frequency gain value may be expressed by the following Table 11:

TABLE 11

| index | 0 | 1 | 2 | 3 | ... | 149 | 200 |
|---|---|---|---|---|---|---|---|
| gain | 0 | 0.02 | 0.04 | 0.06 | ... | 3.98 | 4.00 |

1.2. When a preset type is a static/channel preset, that is, when a value of 'preset_type' is 7, 8, 9:

When mixing information is stored for each channel, the mixing information may be stored by considering a number of input tracks, a number of channels for each input track, and an output channel type. In this case, syntax of a preset included in 'prst' may be expressed by the following Table 12 through Table 14:

TABLE 12

```
if(preset_type == 6){ // static object volume preset
    unsigned int(8)   num_input_channel[num_preset_track];
    unsigned int(8)   output_channel_type;
    for (i=0; i<num_preset_track; i++){
        for (j=0; j<num_input_channel[i]; j++){
            for (k=0; k<num_output_channel; k++){
                unsigned int(8)      preset_volume;
            }
        }
    }
}
```

TABLE 13

```
if(preset_type == 7){ // static object volume preset with equalization
    for (i=0; i<num_preset_track; i++){
        for (j=0; j<num_input_channel[i]; j++){
            for (k=0; k<num_output_channel; k++){
                unsigned int(8)   preset_volume;
                unsigned int(8)   num_freq_band;
                for(m=0; m<num_freq_band; m++){
                    unsigned int(16)     center_freq;
                    unsigned int(16)     bandwidth;
                    unsigned int(8)      preset_freq_gain;
                }
            }
        }
    }
}
```

TABLE 14

```
if(preset_type == 8){ // static object equalization preset
    for (i=0; i<num_preset_track; i++){
        for (j=0; j<num_input_channel[i]; j++){
            for (k=0; k<num_output_channel; k++){
                unsigned int(8)   num_freq_band;
                for(m=0; m<num_freq_band; m++){
                    unsigned int(16)     center_freq;
                    unsigned int(16)     bandwidth;
                    unsigned int(8)      preset_freq_gain;
                }
            }
        }
    }
}
```

Semantics according to the syntax of the above Table 12 through Table 14 may follow as:

'num_input_channel[num_preset_track]' denotes an array to store information about the number of channels for each input track.

For example, 'num_input_channel[num_preset_track]' may be constructed using 'channel_count' information existing in 'moov'/'track'/'media'/'minf'/'stbl'/'stsd'. When the input track includes a mono channel, 'num_input_channel[num_preset_track]' may have a value of '1'. When the input track includes a stereo channel, 'num_input_channel[num_preset_track]' may have a value of '2'. When the input track includes 5-channel, 'num_input_channel[num_preset_track]' may have a value of '5'.

'output_channel_type' denotes the output channel type, and 'num_output_channel' denotes a number of output channels. For example, 'output_channel_type' and 'num_output_channel' may have the relationship as given by the following Table 15:

TABLE 15

| output_channel_type | Meaning | num_output_channel |
|---|---|---|
| 0 | mono channel | 1 |
| 1 | stereo channel | 2 |
| 2 | 5 channel | 5 |

According to an embodiment of the present invention, when the preset type is a static/object/volume preset and the number of output channels is five, mixing information stored in 'prst' may be expressed by the following Table 16:

TABLE 16

| | | preset_track_ID = 1 | | preset_track_ID = 7 |
|---|---|---|---|---|
| | | L | R | M |
| output channel volume | L | 50 | 0 | 50 |
| | R | 0 | 80 | 50 |
| | C | 50 | 80 | 0 |
| | Ls | 0 | 0 | 30 |
| | Rs | 0 | 0 | 30 |

In this case, each of parameters stored in 'prst' may have the following relationship:
  num_preset_track=2
  preset_track_ID[2]=[1, 7]
  num_input_channel[2]=[2, 1]
  num_output_channel=5
  preset_volume=[50, 0, 50, 0, 0, 0, 80, 80, 0, 0, 50, 50, 0, 30, 30]

Here, referring to 'preset_volume', it can be known that some stored mixing information are duplicated. In this case, since an amount of information to be stored may unnecessarily increase, there is a need for a scheme that may decrease the amount of information to be stored in 'prst'. Description related thereto will be made in detail with reference to the following "2-b), c), and d)'.

2. When a preset type is a dynamic preset:

When the preset type is the dynamic preset, mixing information may be updated in a plurality of frames constituting the object-based audio content and thus different mixing information may be stored.

Accordingly, the mixing information may be expressed in a matrix according to a frame number or a sampling number. Also, the matrix may be expressed in a form of a table mapping a frame of an input track and mixing information corresponding thereto.

Hereinafter, a scheme of storing mixing information when the updated mixing information is expressed by a mapping table will be described detail, and the mixing table may be given by the following Table 17:

TABLE 17

| | Input Track | |
|---|---|---|
| sampling number | preset_track ID = 1 | preset_track ID = 3 |
| 1 | 50 | 20 |
| 2 | 50 | 20 |
| ... | ... | ... |
| 9 | 50 | 20 |
| 10 | 50 | 20 |
| 11 | 50 | 10 |
| 12 | 50 | 10 |
| ... | ... | ... |
| 19 | 50 | 10 |
| 20 | 50 | 10 |
| 21 | 70 | 60 |
| 22 | 70 | 60 |
| ... | ... | ... |
| 29 | 70 | 60 |
| 30 | 70 | 60 | a) Store a mixing information value according to a frame number as is:

b) Store a mixing information value according to a frame number as a reference value and a mixing information difference value with respect to the reference value:

The reference value denotes a reference mixing information value in a reference frame. Accordingly, the reference mixing information value in the reference frame, and a difference value between the reference mixing information value and mixing information in the remaining frames excluding the reference frame may be stored in 'prst'.

When the reference value is zero, the above Table 17 may be briefly expressed by the following Table 18:

TABLE 18

| sampling count | Input Track preset_track ID = 1 |
|---|---|
| 20 | 50 |
| 10 | 70 |

| sampling count | Input Track preset_track ID = 3 |
|---|---|
| 10 | 20 |
| 10 | 10 |
| 10 | 60 |

Accordingly, when the mixing information is stored in 'prst' in a form of the above Table 18, an amount of information to be stored may decrease.

c) Store mixing information flag information indicating a duplication:

When a mixing information value of a previous frame is the same as a mixing information value of a current frame, the present scheme may store flag information indicating that the mixing information value of the previous frame is the same as the mixing information value of the current frame, without storing the mixing information value, and thereby may decrease an amount of information to be stored in 'prst'.

In this case, although the mixing information value is updated over time, there may be no great probability that mixing information may be updated for each frame. Accordingly, it may be ineffective to assign a flag value to each frame.

According to an embodiment of the present invention, there is provided a method of generating an object-based audio content that may store a mixing information value and flag information based on information about a frame interval where mixing information is updated.

For example, when the mixing information is updated as shown in the above Table 17, mixing information, that is, volume information may be updated based on a unit of 10 frames. Accordingly, the above Table 17 may be briefly expressed by the following Table 19:

TABLE 19

| preset_volume | 50 | 50 | 70 | 20 | 10 | 60 |
|---|---|---|---|---|---|---|
| volume_flag | 0 | 1 | 0 | 0 | 0 | 0 |
| modified preset_volume | 50 | — | 70 | 20 | 10 | 60 |

Accordingly, parameters stored in 'prst' may have the following relationship:
dynamic_interval=10
volume_flag=[0, 1, 0, 0, 0, 0]
preset_volume=[50, 70, 20, 10, 60]

Here, 'dynamic_interval' denotes the frame interval, and 'volume_flag' denotes volume flag information. When mixing information of the previous frame is the same mixing information of the current frame, 'volume_flag' may have a value of '1'. Conversely, when mixing information of the previous frame is different from mixing information of the current frame, 'volume_flag' may have a value of '0'.

Referring to this, a plurality of frames included in the object-based audio content may be classified into a frame group according to a particular frame interval. The mixing information may be stored for each frame group.

Specifically, according to an embodiment of the present invention, when first group mixing information about a first frame group is different from second group mixing information about a second frame group, a preset parameter to be stored in 'prst' may include the first group mixing information, the second group mixing information, first flag information indicating that the first group mixing information is different from the second group mixing information, and a number of frames that are included in each of frame groups, that is, a frame interval.

Conversely, when the first group mixing information is the same as the second group mixing information, the preset parameter to be stored in 'prst' may include the first group mixing information, second flag information indicating that the first group mixing information is the same as the second group mixing information, and the number of frames that are included in each of the frame groups.

d) Store mixing information using a number of times that mixing information is updated and a frame number of a frame where the mixing information is updated:

According to the present scheme, the number of times that the mixing information is updated, the frame number of the frame where the mixing information is updated, and mixing information corresponding thereto may be stored. Accordingly, the present scheme may be more effective than the scheme described above in 'c)'.

For example, when the mixing information is updated as shown in the above Table 17, the number of times that the mixing information is updated, the frame number of the frame where the mixing information is updated, and the mixing information, that is, the volume information, to be stored in 'prst' may follow as:
num_updates=3
updated_sample_number=[1, 11, 21]
preset_volume=[50, 20, 50, 10, 70, 60]

Here, 'num_updates' denotes the number of times that the mixing information is updated, and 'updated_sample_number' denotes the frame number of the frame where the mixing information is updated.

Schemes of effectively storing mixing parameters the mixing information is updated over a play time have been described above in detail. The above schemes may be applicable even when a preset type is a static preset and stored mixing information is duplicated.

For example, when the mixing information stored in 'prst' is expressed by the above Table 16 and the mixing information is stored according to the scheme of 'c)' using flag information, the above Table 16 may be modified as given by the following Table 20:

TABLE 20

| | | | | | | | | | | | | | | | | |
|---|---|---|---|---|---|---|---|---|---|---|---|---|---|---|---|---|
| preset_volume | 50 | 0 | 50 | 0 | 0 | 0 | 80 | 80 | 0 | 0 | 50 | 50 | 0 | 30 | 30 |
| volume_flag | 0 | 0 | 0 | 0 | 1 | 1 | 0 | 1 | 0 | 1 | 0 | 1 | 0 | 0 | 1 |
| modified_preset_volume | 50 | 0 | 50 | 0 | — | — | 80 | — | 0 | — | 50 | — | 0 | 30 | — |

Accordingly, parameters stored in 'prst' may have the following relationship:
volume_flag=[0, 0, 0, 0, 1, 1, 0, 1, 0, 1, 0, 1, 0, 0, 1]
preset_volume=[50, 0, 50, 0, 80, 0, 50, 0, 30]

In this case, the syntax of the preset in 'prst' of the above Table 12 may be modified as given by the following Table 21:

TABLE 21

```
if(preset_type == 6){ // static object volume preset
    unsigned int(8)        num_input_channel[num_preset_track];
    unsigned int(8)        output_channel_type;
    unsigned int(16)       num_volume_flag;
    for (i=0; i<num_volume_flag; i++){
        unsigned int(8)    volume_flag;
        if(volume_flag==0){
            unsigned int(8) preset_volume;
        }
    }
}
```

Semantics according to the syntax of the above Table 21 may follow as:

'volume_flag' denotes volume flag information and may have a data type of a one-bit integer. When mixing information of the previous information is the same as mixing information of the current frame, 'volume_flag' may have a value of '1'. Conversely, when the mixing information of the previous frame is different from the mixing information of the current frame, 'volume_flag' may have a value of '0'.

'num_volume_flag' denotes an array length of 'volume_flag'.

Hereinafter, an embodiment of storing mixing information of a dynamic preset in 'prst' based on the aforementioned preset storage scheme will be described in detail.

2.1. When a preset type is a dynamic/track preset, that is, when a value of 'preset_type' is 3, 4, 5:

As described above, when the preset type is a track type, an output channel type may not be considered to store mixing information.

According to an embodiment of the present invention, syntax of a preset included in 'prst' may be expressed by the following Table 22 through Table 24. The syntax shown in the following Table 22 through Table 24 may be associated with a scheme of storing mixing information using the aforementioned scheme of 'd)'.

TABLE 22

```
if(preset_type == 3)){ // dynamic track volume preset
    unsigned int(16)       num_updates;
    for(i=0; i<num_updates; i++){
        unsigned int(16)       updated_sample_number;
        for(j=0; j<num_preset_track; j++){
            unsigned int(8) preset_volume;
        }
    }
}
```

TABLE 23

```
if(preset_type == 4){ // dynamic track volume preset with equalization
    unsigned int(16)    num_updates;
    for(i=0; i<num_updates; i++){
        unsigned int(16)    updated_sample_number;
        for(j=0; j<num_preset_track; j++){
            unsigned int(8)        preset_volume;
            unsigned int(16)       num_freq_band;
            for (k=0; k<num_freq_band; k++){
                unsigned int(16)        center_freq;
                unsigned int(16)        bandwidth;
                unsigned int(8)         preset_freq_gain;
            }
        }
    }
}
```

TABLE 24

```
if(preset_type == 5){ // dynamic track equalization preset
    unsigned int(16)    num_updates;
    for(i=0; i<num_updates; i++){
        unsigned int(16)    updated_sample_number;
        for(j=0; j<num_preset_track; j++){
            unsigned int(16)    num_freq_band;
            for(k=0; k<num_freq_band; k++){
                unsigned int(16)    center_freq;
                unsigned int(16)    bandwidth;
                unsigned int(8)     preset_freq_gain;
            }
        }
    }
}
```

Semantics according to the syntax of the above Table 22 through Table 24 may follow as:

'num_updates' denotes the number of times that the mixing information is updated.

'updated_sample_number' denotes the frame number of the frame where the mixing information is updated.

Also, when the mixing information is stored according to the scheme of 'c)', the syntax of the above Table 22 may be modified as given by the following Table 25:

TABLE 25

```
if(preset_type == 3)){ // dynamic track volume preset
    unsigned int(8)     dynamic_interval;
    unsigned int(32)    num_volume_flag;
    for(i=0; i< num_volume_flag; i++){
        unsigned int(8) volume_flag;
        if(volume_flag =0){
```

TABLE 25-continued

```
            unsigned int(8) preset_volume;
        }
    }
}
```

Semantics according to the syntax of the above Table 25 may follow as:

'dynamic_interval' denotes the frame interval.

2.2. When a preset type is a dynamic/channel preset, that is, when a value of 'preset_type' is 9, 10, 11:

As described above, when mixing information is stored for each channel, the mixing information may be stored by considering a number of input tracks, a number of channels for each input track, and an output channel type.

In this case, syntax of a preset in 'prst' may be given by the following Table 26 through Table 28. The syntax of the following Table 26 through Table 28 may be associated with a scheme of storing the mixing information using the scheme of 'd)'.

TABLE 26

```
if(preset_type == 9){ // dynamic object volume preset
    unsigned int(16)       num_updates;
    for(i=0; i<num_updates; i++){
        unsigned int(16)       updated_sample_number;
        for(j=0; j<num_preset_track; j++){
            for (k=0; k<num_input_channel[j]; k++){
                for (m=0; m<num_output_channel; m++){
                    unsigned int(8)        preset_volume;
                }
            }
        }
    }
}
```

TABLE 27

```
if(preset_type == 10){ // dynamic object volume preset with equalization
    unsigned int(16)    num_updates;
    for(i=0; i<num_updates; i++){
        for(j=0; j<num_preset_track; j++){
            for (k=0; k<num_input_channel[i]; k++){
                for (m=0; m<num_output_channel; m++){
                    unsigned int(8)    preset_volume;
                    unsigned int(8)    num_freq_band;
                    for(m=0; m<num_freq_band; m++){
                        for(n=0; n<num_freq_band; n++){
                            unsigned int(16)    center_freq;
                            unsigned int(16)    bandwidth;
                            unsigned int(8)     preset_freq_gain;
                        }
                    }
                }
            }
        }
    }
}
```

TABLE 28

```
if(preset_type == 11){ // dynamic object equalization preset
    unsigned int(16)       num_updates;
    for(i=0; i<num_updates; i++){
        for(j=0; j<num_preset_track; j++){
            for (k=0; k<num_input_channel[i]; k++){
                for (m=0; m<num_output_channel; m++){
                    unsigned int(8)        num_freq_band;
                    for(m=0; m<num_freq_band; m++){
                        for(n=0; n<num_freq_band; n++){
```

TABLE 28-continued

```
            unsigned int(16)      center_freq;
            unsigned int(16)      bandwidth;
            unsigned int(8)       preset_freq_gain;
          }
        }
      }
    }
  }
}
```

It has been described that the mixing information includes only the volume information and the equalization information. However, according to an embodiment of the present invention, the mixing information may further include a magnitude value of a sound image and an angle value of the sound image. The sound image may be formed by at least one input channel. The magnitude value of the sound image and the angle value of the sound image may be a preset parameter to determine a virtual position of the sound image.

In this case, the angle value of the sound image may be quantized and thereby be stored. For example, the angle value of the sound image may be expressed in a form as given by the following Table 29:

TABLE 29

| index | 0 | 1 | 2 | 3 | 4 | 5 | 6 |
|---|---|---|---|---|---|---|---|
| value(°) | 0 | 5 | 10 | 15 | 20 | 25 | 30 |
| index | 7 | 8 | 9 | 10 | 11 | 12 | 13 |
| value(°) | 40 | 50 | 60 | 70 | 80 | 90 | 100 |
| index | 14 | 15 | 16 | 17 | 18 | 19 | 20 |
| value(°) | 110 | 120 | 130 | 140 | 150 | 160 | 170 |
| index | 21 | 22 | 23 | 24 | 25 | 26 | 27 |
| value(°) | 180 | 190 | 200 | 210 | 220 | 230 | 240 |
| index | 28 | 29 | 30 | 31 | 32 | 33 | 34 |
| value(°) | 250 | 260 | 270 | 280 | 290 | 300 | 310 |
| index | 35 | 36 | 37 | 38 | 39 | 40 | 41 |
| value(°) | 320 | 330 | 335 | 340 | 345 | 350 | 355 |

According to an embodiment of the present invention, the object-based audio content may further include a mono/stereo audio signal that is a down-mixed signal of an audio signal mixed based on any one of at least one preset.

The mono/stereo audio signal may be stored for an interaction with an audio play device incapable of playing the object-based audio content.

When the object-based audio content further includes the mono/stereo audio signal, an audio play device capable of playing the object-based audio content may play the object-based audio content based on a plurality of audio objects and at least one preset. The audio play device incapable of playing the object-based audio content may play the mono/stereo audio signal. Accordingly, the object-based audio content may be played regardless of a type of the audio play device.

For example, the mono/stereo audio signal may be stored in 'mdat'. In this case, semantics of flags included in 'moov'/'trak'/'tkhd' may be modified s given by the following Table 30. In the following Table 30, an underlined portion corresponds to semantics to be deleted and a bolded portion corresponds to semantics to be added.

TABLE 30 flags - is a 24-bit integer with flags; the following values are defined:
Track_enabled: Indicates that the track is enabled. Flag value is 0x000001. A disabled track (the low bit is zero) is treated as if it were not present.
Track_in_movie: Indicates that the track is used in the presentation. Flag value is 0x000002.
Track_in_interaction_movie: Indicates that the track is used in the presentation by an interactive music player. Flag value is 0x000002.
Track_in_non_interaction_movie: Indicates that the track is used in the presentation by a non-interactive music player. Flag value is 0x000003.
Track_in_preview: Indicates that the track is used when previewing the presentation. Flag value is 0x000004.

Store a Preset Parameter in 'trak' Existing in 'moov' Using an MPEG-4 Binary Format for Scene (BIFS)

According to an embodiment of the present invention, the preset parameter may be stored in 'trak' existing in 'moov' using the MPEG-4 BIFS.

In this case, among preset parameters, a first preset parameter, for example, a number of presets, a default preset ID, and the like, indicating the entire preset information may be stored in 'prco', and may also be stored in a node that is newly defined in BIFS.

When the first preset parameter is stored using the newly defined node, a node interface may be expressed by the following Table 31. 'PresetSound' denotes the newly defined node in the following Table 31:

TABLE 31

| node interface |
|---|
| PresetSound{ |
| exposedField SFNode source NULL |
| exposedField SFInt32 numPresets 1 |
| exposedField SFInt32 default_preset ID 1 |
| } |

Semantics according to the node interface of the above Table 31 may follow as:

A 'source' field follows semantics of sub-clause 7.2.2.116 of ISO/IEC (International Electrotechnical Commission) 14496-11:2005.

A 'numPreset' field and a 'default_preset_ID' field follow the aforementioned semantics of 'prco'.

Also, among the preset parameters, a preset parameter indicating volume information may be stored by appropriately combining an AudioMix node and a WideSound node.

Also, among the preset parameters, a preset parameter indicating equalization information may be stored using PROTO audioEcho of an existing AudioRXProto node, and may also be stored using the node that is newly defined in the BIFS.

When equalization information, more accurately, a frequency gain value is stored using the newly defined node, the node interface may be expressed by the following Table 32. 'PersetAudioEqualizer' denotes the newly defined node in the following Table 32:

TABLE 32

| node interface |
| --- |
| PresetAudioEqualizer{ |
| eventIn MFNode addChildren |
| eventIn MFNode removeChildren |
| exposedField MFNode children [ ] |
| exposedField SFInt32 numInputs 1 |
| exposedField MFFloat params [ ] |
| } |

Semantics according to the node interface of the above Table 32 may follow as:

A 'children' field denotes an output of nodes that may be simultaneously mixed. For example, the 'child' field may be AudioSource, AudioMix, and the like.

'addChildren' denotes a list of nodes to be added to the 'children' field.

'removeChildren' denotes a list of nodes to be removed from the 'children' field.

A 'numInputs' field denotes a number of input tracks.

A 'params' field denotes a matrix of [numInputs 3·numumFreqBands]. An equalization parameter, that is, equalization information of a frequency band to be applied to each input track may be stored in each column. It may be expressed by the following Table 33:

TABLE 33

| Data Type | Function | Default value | Range |
| --- | --- | --- | --- |
| float | numFreqBands | 2 | 0, . . . , 32 |
| float[ ] | centerFreq | [ ] | 0, . . . , 20000 |
| float[ ] | bandwidth | [ ] | 0, . . . , 20000 |
| float[ ] | gain | 1 | 0.1, . . . , 10 |

Here, 'numFreqBands' denotes a number of frequency bands, 'centerFreq' denotes a center frequency of each of the frequency bands, 'bandwidth' denotes a bandwidth in each of the frequency bands, and 'gain' denotes a gain value for each of the frequency bands.

Specifically, columns of the 'params' field may be constructed as follows:

numFreqBands=params [0]

centerFreq [0 . . . numFreqBands−1]=params [1 . . . numFreqBands]

bandwidth [0 . . . numFreqBands-1]=params [numFreqBands+1 . . . 2·numFreqBands]

gain [0 . . . numFreqBands−1]=params [2·numFreqBands+1 . . . 3·numFreqBands]

Store a Preset Parameter in 'xml' Existing in 'meta' Using an MPEG-4 Lightweight Application Scene Representation (LASeR):

According to an embodiment of the present invention, the preset parameter may be stored in 'xml' existing in 'meta' using the MPEG-4 LASeR.

In this case, the preset parameter may be stored by newly defining elements and attributes as given by the following Table 34:

TABLE 34 i. presetContainer element
semantics

The same information as 'prco' is stored in a presetContainer element.
attribute 'numPreset' denotes a number of presets.
'defaultPresetID' denotes a default preset ID.

TABLE 34-continued ii. preset element
semantics

The same information as 'prst' is stored in a preset element. Also, the preset element exists as children of the presetContainer element.
attribute The aforementioned syntax and semantics of 'prst' of the ISO-BMFF are used as attributes.

Others

According to an embodiment of the present invention, when preset information is pre-described in a file including a plurality of audio objects, it is possible to store a preset parameter in an object-based audio content format by controlling the object-based audio content format to refer to the preset information, or by modifying the preset information to be suitable for the object-based audio content format.

Also, according to an embodiment of the present invention, when preset information is described in a file that is constructed in a scene expression language such as a BIFS or a LASeR, it is possible to store a preset parameter in an object-based audio content format by controlling the object-based audio content format to refer to the preset information, or by modifying the preset information to be suitable for a schema of the object-based audio content format.

Also, according to an embodiment of the present invention, when preset information is obtained file including only a preset, it is possible to refer the file. Also, the preset information in the file can be stored in an object-based audio content format As described above, description information or descriptive metadata may be additionally stored in the object-based audio content. The stored description information or descriptive metadata may be used to perform searching and filtering for the object-based audio content. Hereinafter, a method of storing the description information will be described with reference to FIGS. 7 and 8.

Figure 7:
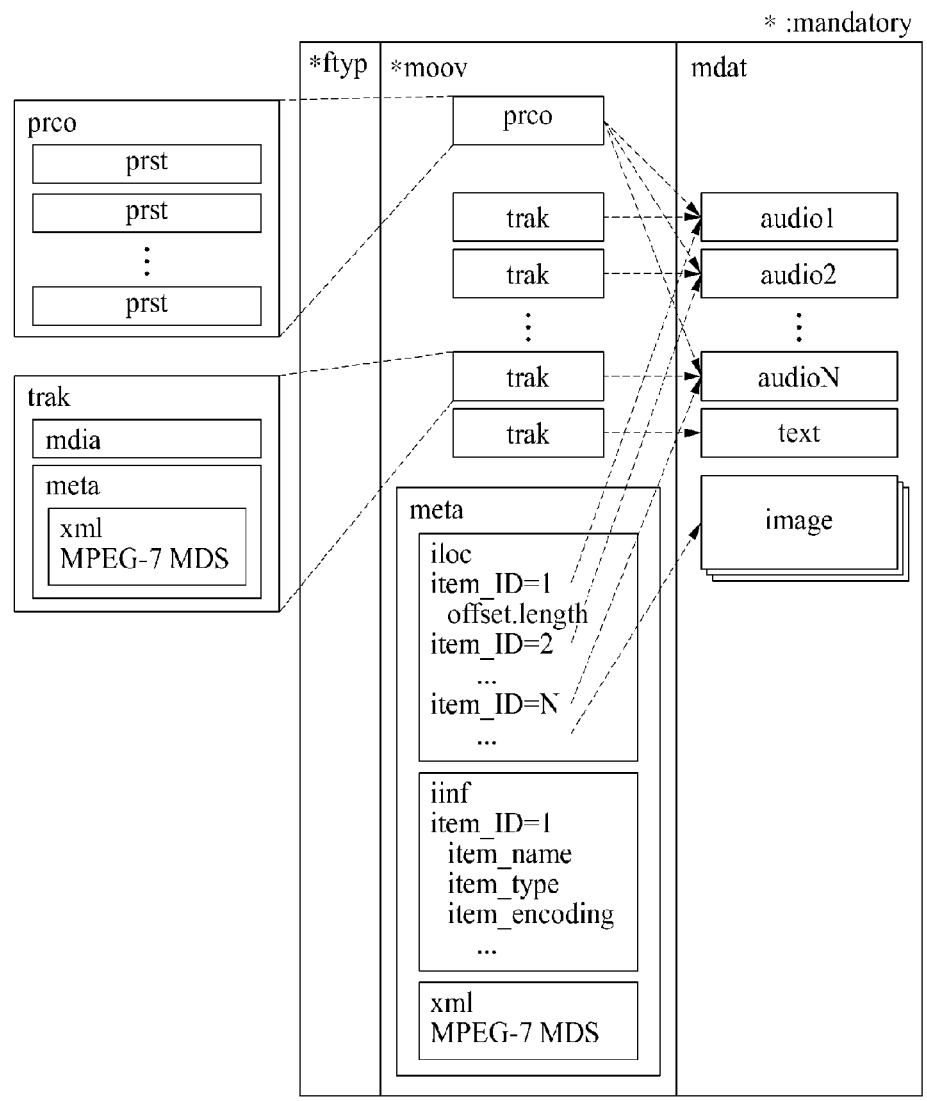
FIGS. 7 and 8 illustrate a structure of a file format for storing an object-based audio content including description information according to an embodiment of the present invention.
Figure 8:
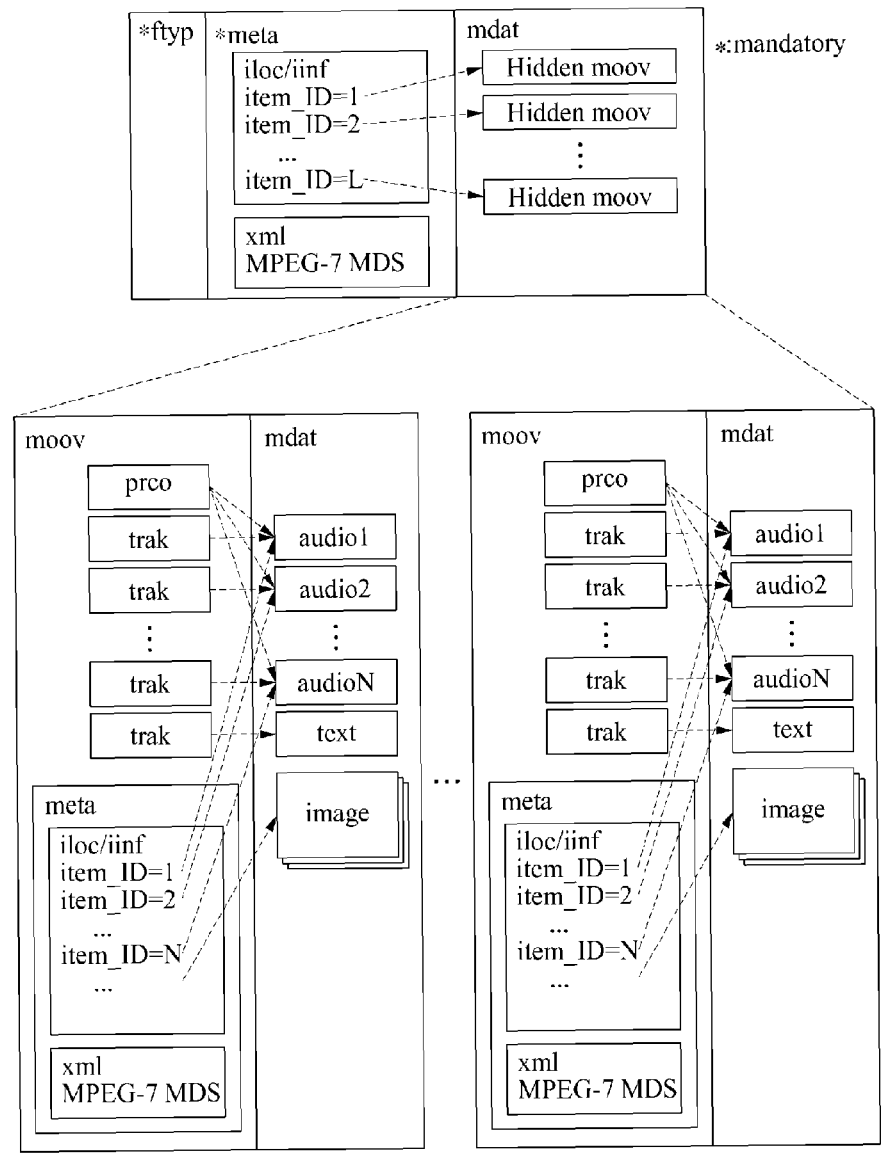

FIGS. 7 and 8 illustrate a structure of a file format for storing an object-based audio content including description information according to an embodiment of the present invention.

In an ISO object-based audio content format, the description information may include metadata for expressing an album (hereinafter, 'album level metadata'), metadata for expressing a song (hereinafter, 'song level metadata'), and metadata for expressing a track (hereinafter, 'track level metadata'). Here, each of the metadata may be given by the following Table 35:

TABLE 35

| | Level | | |
| --- | --- | --- | --- |
| Description | album | song | track |
| title | ○ | ○ | ○ |
| singer | ○ | ○ | — |
| composer | — | ○ | — |
| lyricist | — | ○ | — |
| performing musician | — | — | ○ |
| genre | ○ | ○ | — |
| file date | ○ | ○ | ○ |
| CD track number of the song | — | ○ | — |
| production | ○ | ○ | — |
| publisher | ○ | ○ | — |
| copyright information | ○ | ○ | — |
| ISRC (International Standard Recording Code) | — | ○ | — |
| image | ○ | ○ | — |

TABLE 35-continued

| Description | Level | | |
| --- | --- | --- | --- |
| | album | song | track |
| URL site address related to the music and the artist(e.g. album homepage, fan cafe, music video) | ○ | ○ | — |

The metadata may be classified into two types, that is, "metadata for expressing a song and a track" and "metadata for expressing an album". Here, "metadata for expressing the album (i.e album level metadata)" may express common information about songs, included in the same album, among songs stored in the object-based audio content.

'album level metadata' may be stored in 'ftyp'/'meta', 'song level metadata' may be stored in 'moov'/'meta', and 'track level metadata' may be stored in 'moov'/'trak'/'meta'. It may be arranged as given by the following Table 36:

TABLE 36

| Metadata | Location |
| --- | --- |
| track level | trak/meta box |
| song level | moov/meta box |
| album level | meta box of file |

The structure of the ISO object-based audio content file format where the metadata are stored may be provided as shown in FIGS. 7 and 8. The format structure of FIG. 7 indicates a single type file structure, and the format structure of FIG. 8 indicates a multiple type file structure.

Here, the metadata may be handled according to an mpeg-7 type (mp7t).

More specifically, 'CreationInformation', 'MediaInformation', and 'Semantics DS' of MPEG-7 may be used for 'track level metadata' and 'song level metadata'. 'Content-Collection DS' and 'CreationInformation DS' of MPEG-7 may be used for 'album level metadata'. This is because 'album level metadata' includes structure information about a plurality of songs included in a single album.

It may be arranged as given by the following Table 37 through Table 39:

TABLE 37

| Tag Name | Semantics |
| --- | --- |
| CreationInformation/Creation/Creator[@type="Instrument"] | The title of the track |
| CreationInformation/Creation/Creator[Role/@herf="urn:mpeg:mpeg7: RoleCS:2001:PERFORMER"]/Agent[@xsi : type = "PersonType"] / Name / {FamilyName, GivenName}(Arist name) | The name of a musician who is performing instruments, such as vocal, guitar, keyboard and so on |
| CreationInformation/Creation/Creator[Role/@herf= "urn:mpeg: mpeg7: RoleCS:2001:PERFORMER"]/Agent[@xsi : type = "PersonGroupType"]/ Name/(Group Name) | |
| CreationInformation/CreationCoordinates/Date/TimePoint | Time point of the recording |

TABLE 38

| Tag Name | Semantics |
| --- | --- |
| CreationInformation/Creation/Title[@type="songTitle"] | The title of the song |
| CreationInformation/Creation/Creator[Role/@herf="urn: mpeg : mpeg7: RoleCS:2001:PERFORMER"]/Agent[@xsi : type = "PersonType"] / Name /{FamilyName, GivenName}(Arist name) CreationInformation/Creation/Creator[Role/@herf= "urn : mpeg : mpeg7: RoleCS:2001:PERFORMER"]/Agent[@xsi : type = "PersonGroupType"] /Name/(Group Name) | The name of a musician such as singer, composer and lyricist |
| CreationInformation/Classification/Genre[@herf="urn:id3:v1:genreID"] | Genre |
| CreationInformation/CreationCoordinates/Date/TimePoint | Time point when the song is released |
| Semantics/SemanticBase[@xsi:type="SemanticStateType"]/ AttributeValuePair | CD track number of the song |
| CreationInformation/Creation/Abstract/FreeTextAnnotation | Information on production, Publisher and site address related to the music and the artist (e.g. album homepage, fan cafe and music video) |
| CreationInformation/Creation/copyrightString | Textual label indicating information that may be displayed or otherwise made known to the end user |
| MediaInformation/MediaIdentification/EntityIdentifier | ISRC |
| CreationInformation/Creation/TitleMedia[@type="TitleImage"] | |

TABLE 39

| Tag Name | Semantics |
| --- | --- |
| ContentCollection/CreationInformation/Creation/Title[@type="albumTitle"] | The title of the album |
| ContentCollection/CreationInformation/Creation/Creator[Role/@href="urn:mpeg:mpeg7:RoleCS:2001:PERFORMER"]/Agent[@xsi:type = "PersonType"]/ Name /{FamilyName, GivenName}(Arist name) CreationInformation/Creation/Creator[Role/@herf= "urn:mpeg: mpeg7:RoleCS:2001:PERFORMER"]/Agent[@xsi : type = "PersonGroupType"]/Name/(Group Name) | The name of representative musician of the album |
| ContentCollection/CreationInformation/Classification/Genre[@href="urn:id3:v1:genreID"] | Genre |
| ContentCollection/CreationInformation/CreationCoordinates/Date/Timepoint | Time point when the album is related |
| ContentCollection/CreationInformation/Creation/Abstract/FreeText Anotation | Information on production, publisher and site address related to the music and the artist (e.g. album homepage, fan cafe and music video) |
| ContentCollection/CreationInformation/Creation/CopyrightString | Textual label indicating information that may be displayed or otherwise made known to the end user |
| ContentCollection/CreationInformation/Creation/TitleMedia[@type ="TitleImage"] | The title of the multimedia content in image form |

Also, audio content information such as lyrics of a song and the like may be included in the object-based audio content. When the object-based audio content is played and in this instance, the audio content information is displayed on an audio content play device, it is possible to more effectively provide an object-based audio service. The audio content information may be updated over a play time of the object-based audio content. Hereinafter, the audio content information that is updated over the play time is referred to as 'Timed Text'.

In the object-based audio content file format, it is possible to provide 'Timed Text' using a timed text standard such as $3^{rd}$ Generation Partnership Project Transport Stream 26.245 (hereinafter, '3GPP Timed Text') and an MPEG-4 Streaming Text Format.

For example, when 'Timed Text' is provided using '3GPP Timed Text', '3GPP Timed Text' may include a text sample and a sample description.

Here, the text sample may include a text string and a sample modifier. The sample modifier may contain information about rendering the text string.

The text sample may be stored in a singe track, that is, a text track of 'mdat' in an ISO-BMFF. The stored text sample may be synchronized with timed media such as an audio track, using information stored in 'stts', 'stsc', 'stco', and the like, existing in 'moov'/'trad'/'mdia'/'minf'/'stbl', and thereby be played.

Also, the sample description may include information about a scheme of rending a text. For example, the sample description may include information about a location of a text to be displayed, a color of the text, a background color, and the like. The sample description may extend 'SampleEntry' to 'TextSampleEntry' and thereby be described in 'stsd'.

The method of generating the object-based audio content according to an embodiment of the present invention has been described above. Hereinafter, a method of playing the object-based audio content that is generated according to the aforementioned object-based audio content generating method will be described with reference to FIG. 5.

Figure 5:
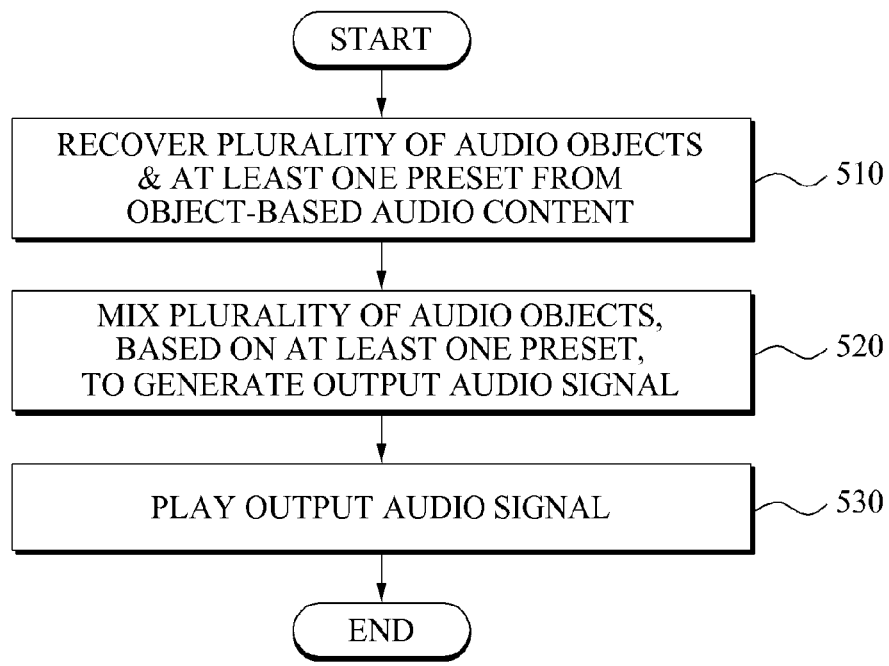
FIG. 5 is a flowchart illustrating a method of playing an object-based audio content according to an embodiment of the present invention.

FIG. 5 is a flowchart illustrating a method of playing an object-based audio content according to an embodiment of the present invention.

In operation 510, the object-based audio content playing method may recover a plurality of audio objects and at least one preset.

In this case, the object-based audio content may be generated according to the object-based audio content generating method described above with reference to FIG. 3.

In operation 520, the object-based audio content playing method may mix the plurality of audio objects, based on the at least one preset, to generate an output audio signal.

In operation 530, the object-based audio content playing method may play the output audio signal.

As described above, when a default preset ID included in a preset parameter has a value of '0', the object-based audio content may be played according to a preset stored in a bitstream of audio objects that are encoded and are stored using an SAOC technology. Hereinafter, a process of playing the object-based audio content based on the preset stored in the bitstream of the audio objects that are encoded and are stored using the SAOC technology will be described in detail with reference to FIG. 6.

Figure 6:
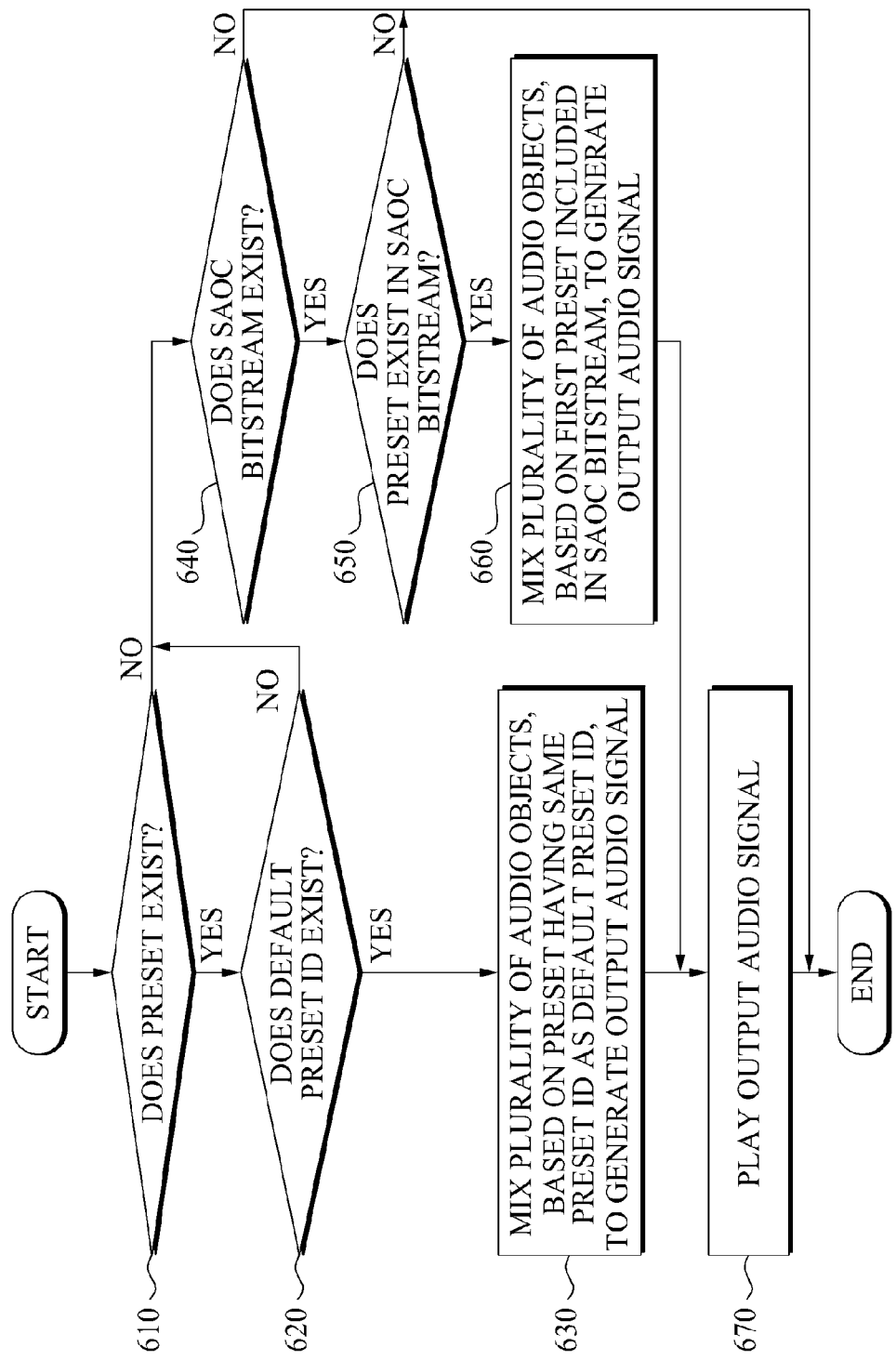
FIG. 6 is a flowchart illustrating a method of playing an object-based audio content according to another embodiment of the present invention.

FIG. 6 is a flowchart illustrating a method of playing an object-based audio content according to another embodiment of the present invention.

In operation 610, the object-based audio content playing method may determine whether a preset exists in the object-based audio content.

When it is determined the preset exists, that is, when it is determined 'num_preset' has a value excluding '0' in operation 610, the object-based audio content playing method may determine whether a default preset ID exists in the object-based audio content in operation 620.

When it is determined the default preset ID exists, that is, when it is determined 'default_preset_ID' has a value excluding '0' in operation 620, the object-based audio content playing method may mix a plurality of contents, based on a preset having the same preset ID as the default preset ID, to generate an output audio signal in operation 630, and may play the output audio signal in operation 670.

Conversely, when it is determined the preset does not exist, that is, when it is determined 'num_preset' has a value of '0' in operation 610, or when it is determined the default preset ID does not exist, that is, when it is determined 'default_preset_ID' has a value of '0' in operation 620, the object-based audio content playing method may determine whether a SAOC bitstream exists in operation 640.

When it is determined the SAOC bitstream exists in operation 640, the object-based audio content playing method may determine whether the preset exists in the SAOC bitstream in operation 650.

When it is determined the preset exists in the SAOC bitstream in operation 650, the object-based audio content playing method may mix the plurality of audio objects, based on a first preset included in the SAOC bitstream, to generate an output audio signal in operation 660, and may play the output audio signal in operation 670.

Conversely, when it is determined the SAOC bitstream does not exist in operation 640, or when it is determined the preset does not exist in the SAOC bitstream in operation 650, the object-based audio content playing method may determine the preset does not exist in the object-based audio content and thus may not play the object-based audio content.

The exemplary embodiments of the present invention include computer-readable media including program instructions to implement various operations embodied by a computer. The media may also include, alone or in combination with the program instructions, data files, data structures, tables, and the like. The media and program instructions may be those specially designed and constructed for the purposes of the present invention, or they may be of the kind well known and available to those having skill in the computer software arts. Examples of computer-readable media include magnetic media such as hard disks, floppy disks, and magnetic tape; optical media such as CD ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention, or vice versa.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A method of generating an object-based audio content, the method comprising:
  receiving a plurality of audio objects;
  generating at least one preset using the plurality of audio objects; and
  storing a preset parameter with respect to an attribute of the at least one preset and the plurality of audio objects,
  wherein the preset parameter is stored in a form of a box that is defined in a media file format about the object-based audio content.

2. The method of claim 1, wherein:
  the box includes a moov box, the moov box includes a first box defined in the moov box, and the first box includes a second box defined in the first box,
  the preset parameter includes a first preset parameter and a second preset parameter, and the first preset parameter includes at least one of a number of the at least one preset and a preset identification (ID) of any one preset of the at least one preset, and
  the first preset parameter is stored in the first box, and the second preset parameter is stored in the second box.

3. The method of claim 1, wherein:
  the box includes an ftyp box and a moov box,
  the ftyp box includes a first meta box and the moov box includes a second meta box, and
  the preset parameter is stored in any one of the first meta box and the second meta box.

4. The method of claim 3, wherein:
  description information of the object-based audio content is stored in the first meta box, and the preset parameter is stored in the second meta box.

5. The method of claim 1, wherein:
  the box includes an ftyp box and a moov box, and
  the preset parameter is stored in any one of a meco box existing in the moov box, or a meco box existing in the ftyp box.

6. The method of claim 1, wherein:
  the storing of the preset parameter further stores description information of the object-based audio content, and
  the description information is stored based on an MPEG-7 type (mp7t).

7. The method of claim 1, wherein:
  the storing of the preset parameter further stores timed text data about the object-based audio content, and
  the timed text data is stored based on any one of a $3^{rd}$ Generation Partnership Project Transport Stream 26.245 (3GPP TS 26.245) and an MPEG-4 Streaming Text Format.

8. The method of claim 1, wherein:
  the box includes a moov box and the moov box includes a track box, and
  the storing of the preset parameter stores the preset parameter in a track box existing in the moov box, using an MPEG-4 Binary Format for Scene (BIFS).

9. The method of claim 1, wherein:
  the box includes a meta box and the meta box includes an xml box, and
  the storing of the preset parameter stores the preset parameter in the xml box using an MPEG-4 Lightweight Application Scene Representation (LASeR).

10. The method of claim 1, wherein:
  the preset parameter includes mixing information about the plurality of audio objects, and
  the mixing information includes at least one of volume information about each of the audio objects and equalization information about each of the audio objects.

11. The method of claim 10, wherein:
  the preset parameter further includes preset global volume information about the plurality of audio objects.

12. The method of claim 10, wherein:
  the object-based audio content includes a plurality of tracks including at least one channel, and
  the mixing information further includes a magnitude value of a sound image and an angle value of the sound image, and the sound image is formed by the at least one channel.

13. The method of claim 10, wherein:
  the equalization information includes a number of frequency bands to be applied with equalization, a center frequency of each of the frequency bands, a bandwidth of each of the frequency bands, and a frequency gain value in each of the frequency bands.

14. The method of claim 13, wherein:
the volume information includes a volume gain value between an input volume value of each of the audio objects and an output volume value of each of the audio objects, and
the volume gain value and the frequency gain value are expressed using a percentage or decibel (dB).

15. The method of claim 10, wherein:
the object-based audio content includes a plurality of frames that are sequentially played, and
the mixing information is updated as the plurality of frames is played.

16. The method of claim 15, wherein:
the preset parameter includes reference mixing information in a reference frame among the plurality of frames, and a difference between the reference mixing information and mixing information in the remaining frames excluding the reference frame from the plurality of frames.

17. The method of claim 15, wherein:
the plurality of frames is classified into a plurality of frame groups including a first frame group and a second frame group that are adjacent to each other, and
when first group mixing information about the first frame group is different from second group mixing information about the second frame group, the preset parameter includes the first group mixing information, the second group mixing information, first flag information indicating that the first group mixing information is different from the second group mixing information, and a number of frames included in each of the frame groups, and
when the first group mixing information is the same as the second group mixing information, the preset parameter includes the first group mixing information, second flag information indicating that the first group mixing information is the same as the second group mixing information, and the number of frames included in each of the frame groups.

18. The method of claim 15, wherein:
the preset parameter includes a number of times that the mixing information is updated, a frame number of a frame where the mixing information is updated, and mixing information in the frame where the mixing information is updated.

19. The method of claim 10, wherein:
the object-based audio content includes a plurality of tracks including at least one channel,
the preset parameter further includes a number of the tracks, a number of the at least one channel for each of the tracks, and a number of at least one output channel to output the object-based audio content, and
the mixing information includes mixing information for each of the at least one output channel.

20. The method of claim 1, wherein:
the storing of the preset parameter further stores a mono/stereo audio signal corresponding to a down-mixed signal of an audio signal that is mixed based on any one preset of the at least one preset.

21. The method of claim 1, wherein:
the media file format is in a structure of an International Standardization Organization (ISO) base media file format.

22. A method of playing an object-based audio content, the method comprising:
recovering a plurality of audio objects and at least one preset from the object-based audio content;
mixing the plurality of audio objects, based on the at least one preset, to generate an output audio signal; and
playing the output audio signal,
wherein each of the at least one preset includes a preset parameter, and the preset parameter is stored in the object-based audio content in a form of a box that is defined in a media file format about the object-based audio content.

23. The method of claim 22, wherein:
the box includes a moov box, the moov box includes a first box defined in the moov box, and the first box includes a second box defined in the first box,
the preset parameter includes a first preset parameter and a second preset parameter, and the first preset parameter includes at least one of a number of the at least one preset and a preset ID of any one preset of the at least one preset, and
the first preset parameter is stored in the first box, and the second preset parameter is stored in the second box.

24. The method of claim 22, wherein:
the preset parameter includes mixing information about the plurality of audio objects, and
the mixing information includes at least one of volume information about each of the audio objects and equalization information about each of the audio objects.

25. The method of claim 24, wherein:
preset parameter further includes preset global volume information about the plurality of audio objects, and
the playing adjusts the global volume of all the mixed audio objects based on the preset global volume information about the plurality of audio objects.

26. The method of claim 24, wherein:
the equalization information includes a number of frequency bands to be applied with equalization, a center frequency of each of the frequency bands, a bandwidth of each of the frequency bands, and a frequency gain value in each of the frequency bands.

27. The method of claim 24, wherein:
the object-based audio content includes a plurality of frames that are sequentially played, and
the mixing information is updated as the plurality of frames is played.

28. The method of claim 27, wherein:
the preset parameter includes reference mixing information in a reference frame among the plurality of frames, and a difference between the reference mixing information and mixing information in the remaining frames excluding the reference frame from the plurality of frames.

29. The method of claim 27, wherein:
the plurality of frames is classified into a plurality of frame groups including a first frame group and a second frame group that are adjacent to each other, and
when first group mixing information about the first frame group is different from second group mixing information about the second frame group, the preset parameter includes the first group mixing information, the second group mixing information, first flag information indicating that the first group mixing information is different from the second group mixing information, and a number of frames included in each of the frame groups, and
when the first group mixing information is the same as the second group mixing information, the preset parameter includes the first group mixing information, second flag information indicating that the first group mixing information is the same as the second group mixing information, and the number of frames included in each of the frame groups.

30. The method of claim 27, wherein:
the preset parameter includes a number of times that the mixing information is updated, a frame number of a frame where the mixing information is updated, and mixing information in the frame where the mixing information is updated.

31. The method of claim 24, wherein:
the object-based audio content includes a plurality of tracks including at least one channel,
the preset parameter further includes a number of the tracks, a number of the at least one channel for each of the tracks, and a number of at least one output channel to output the object-based audio content, and
the mixing information includes mixing information for each of the at least one output channel.

32. The method of claim 22, wherein:
the media file format is in a structure of an ISO base media file format.

33. A computer-readable recording device, running on one or more processors, storing a program for implementing the method according to claim 22.

34. A computer-readable recording device, running on one or more processors, storing data with a file format structure for an object-based audio service, comprising:
an ftyp box to store standard information of an object-based audio content;
an mdat box to store a plurality of audio objects that constitute the object-based audio content; and
a moov box to store metadata that presents the stored plurality of audio objects,
wherein one or more preset parameters with respect to an attribute of at least one preset associated with playing of the object-based audio content and the plurality of audio objects are stored in any one of the ftyp box and the moov box.

35. The computer-readable recording device of claim 34, wherein:
the moov box includes a first box defined in the moov box and a second box defined in the first box, the preset parameter includes a first preset parameter and a second preset parameter, and
the first preset parameter includes at least one of a number of the at least one preset and a preset ID of any one preset of the at least one preset, and
the first preset parameter is stored in the first box, and the second preset parameter is stored in the second box.

36. The computer-readable recording device of claim 34, wherein:
the preset parameter includes mixing information about the plurality of audio objects, and
the mixing information includes at least one of volume information about each of the audio objects and equalization information about each of the audio objects.

37. The computer-readable recording device of claim 36, wherein:
preset parameter further includes preset global volume information about the plurality of audio objects.

38. The computer-readable recording device of claim 36, wherein:
the equalization information includes a number of frequency bands to be applied with equalization, a center frequency of each of the frequency bands, a bandwidth of each of the frequency bands, and a frequency gain value in each of the frequency bands.

39. The computer-readable recording device of claim 37, wherein:
the volume information includes a volume gain value between an input volume value of each of the audio objects and an output volume value of each of the audio objects, and
the volume gain value and the frequency gain value are expressed using a percentage or decibel (dB).

40. The computer-readable recording device of claim 36, wherein:
the object-based audio content includes a plurality of frames that are sequentially played, and
the mixing information is updated as the plurality of frames is played.

41. The computer-readable recording device of claim 40, wherein:
the preset parameter includes reference mixing information in a reference frame among the plurality of frames, and a difference between the reference mixing information and mixing information in the remaining frames excluding the reference frame from the plurality of frames.

42. The computer-readable recording device of claim 40, wherein:
the plurality of frames is classified into a plurality of frame groups including a first frame group and a second frame group that are adjacent to each other, and
when first group mixing information about the first frame group is different from second group mixing information about the second frame group, the preset parameter includes the first group mixing information, the second group mixing information, first flag information indicating that the first group mixing information is different from the second group mixing information, and a number of frames included in each of the frame groups, and
when the first group mixing information is the same as the second group mixing information, the preset parameter includes the first group mixing information, second flag information indicating that the first group mixing information is the same as the second group mixing information, and the number of frames included in each of the frame groups.

43. The computer-readable recording device of claim 40, wherein:
the preset parameter includes a number of times that the mixing information is updated, a frame number of a frame where the mixing information is updated, and mixing information in the frame where the mixing information is updated.

44. The computer-readable recording device of claim 36, wherein:
the object-based audio content includes a plurality of tracks including at least one channel, the preset parameter further includes a number of the tracks, a number of the at least one channel for each of the tracks, and a number of at least one output channels to output the object-based audio content, and
the mixing information includes mixing information for each of the at least one output channel.

45. The computer-readable recording device of claim 34, wherein:
the file format structure is in a structure of an ISO base media file format.

46. A computer-readable recording device, running on one or more processors, storing a program for implementing the method according to claim 1.

* * * * *